United States Patent [19]

Reichental

[11] Patent Number: 4,759,891
[45] Date of Patent: Jul. 26, 1988

[54] METHOD AND APPARATUS OF FOAM MOLDING PACKAGING USING A VERTICAL MOLD

[75] Inventor: Abe Reichental, Bethel, Conn.

[73] Assignee: Sealed Air Corporation, Stamford, Conn.

[21] Appl. No.: 928,965

[22] Filed: Nov. 10, 1986

[51] Int. Cl.[4] .................... B29C 67/22; B29C 39/10
[52] U.S. Cl. ................... 264/46.5; 264/46.6; 264/46.8; 264/101; 264/267; 264/338; 425/127; 425/817 R
[58] Field of Search ............ 264/46.4, 46.5, 46.8, 264/101, 267, 338; 425/127, 817 R

[56] References Cited

U.S. PATENT DOCUMENTS

| | | |
|---|---|---|
| 2,979,246 | 4/1961 | Liebeskind . |
| 3,204,385 | 9/1965 | De Remer et al. . |
| 3,222,843 | 12/1965 | Schneider . |
| 3,952,082 | 4/1976 | Arnaud . |
| 3,984,516 | 10/1976 | Carrow . |
| 4,066,725 | 1/1978 | Boettner . |
| 4,118,454 | 10/1978 | Miki et al. . |
| 4,127,631 | 11/1978 | Dempsey et al. . |
| 4,177,238 | 12/1979 | Allen . |
| 4,278,624 | 7/1981 | Kornylak . |
| 4,390,337 | 6/1983 | Gately ............................. 264/46.4 X |
| 4,422,988 | 12/1983 | Kornylak . |

Primary Examiner—Philip Anderson
Attorney, Agent, or Firm—Bell, Seltzer, Park & Gibson

[57] ABSTRACT

A method and apparatus of foam molding packaging using a positive vertical mold is provided in which a vertical mold with sides having channeled vertical flap areas is automatically covered with a plastic sheet. Brushes, assisted by a vacuum assure the plastic sheet conforms to the mold including the flap areas. An open-ended carton having upper and lower flaps is placed over the mold so that the lower flaps are disposed vertically and cover the vertical flap areas. Foam precursors are dispensed into the carton and its top sealed to allow foaming within the carton. The carton is then removed from the mold with the foam cushioning fully formed therein including the carton flaps which cover the top of the article to be packaged therein.

17 Claims, 3 Drawing Sheets

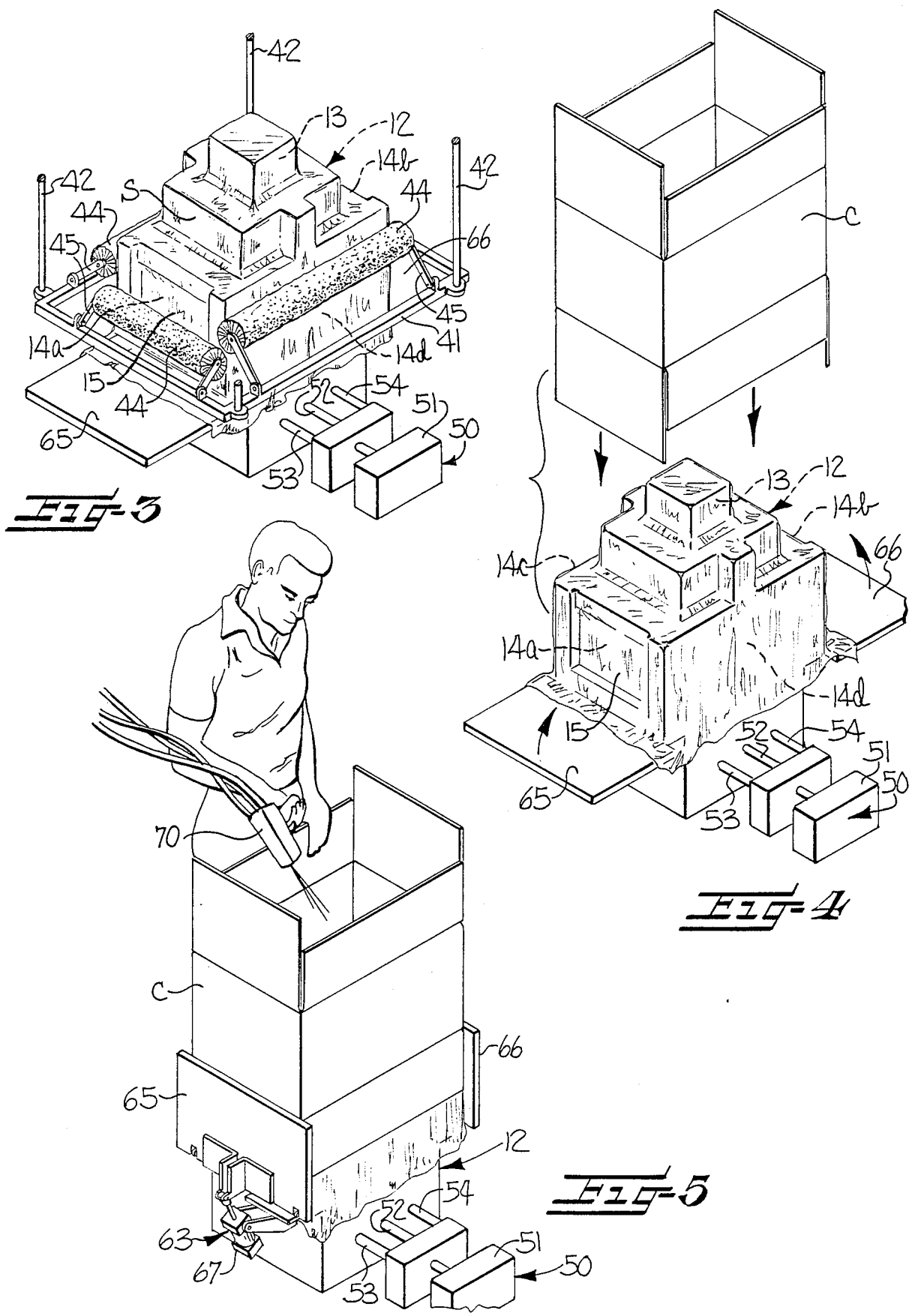

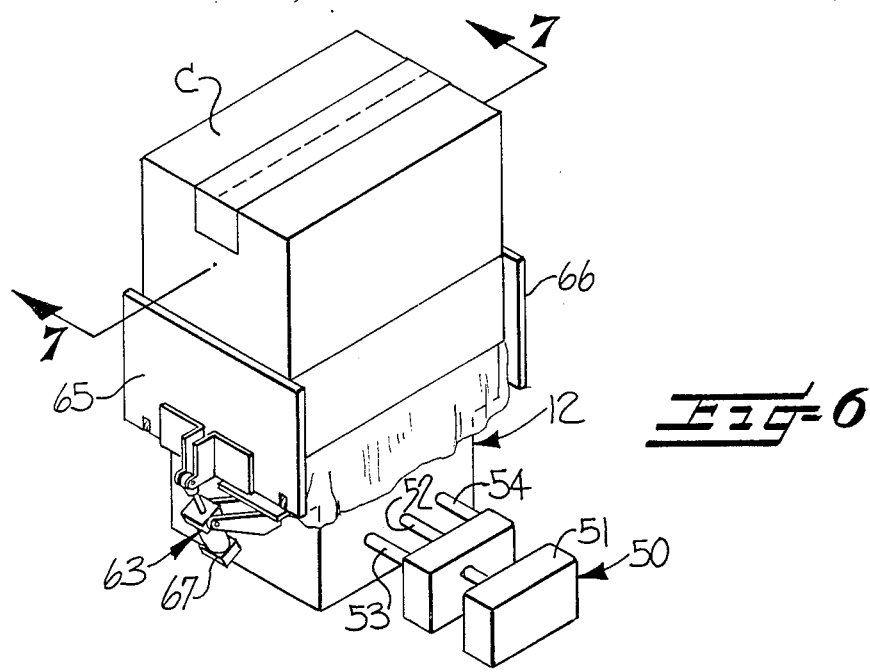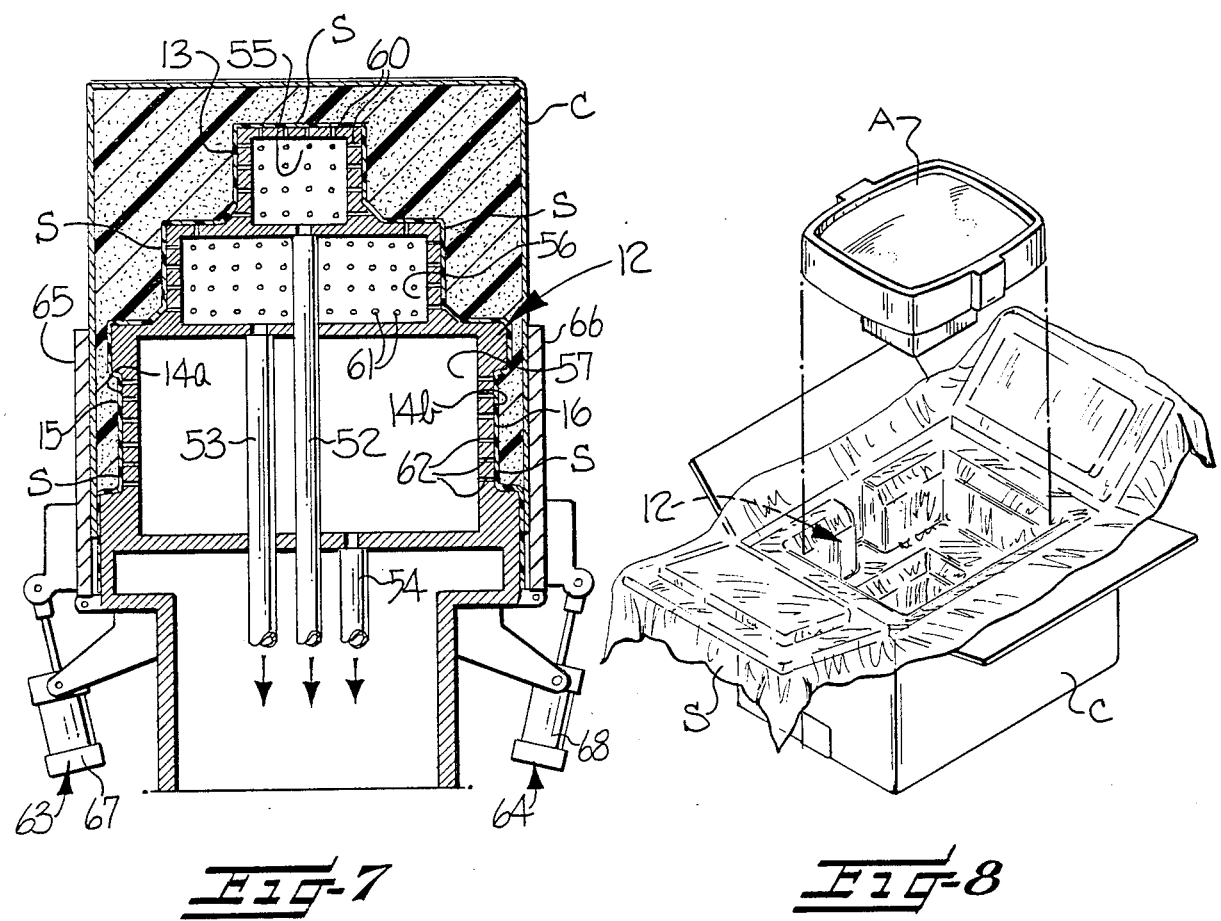

METHOD AND APPARATUS OF FOAM MOLDING PACKAGING USING A VERTICAL MOLD

This invention relates to the molding of foam inside a carton for the cushioning of an article to be placed therein.

BACKGROUND OF THE INVENTION

The shipment of fragile and delicate products and articles mandates the use of packaging which gives sufficient protection against shock, thermal changes, electric fields, moisture, abusive handling and other external influences. The use of plastic foam in a shipping container or carton to partially or wholly surround the packaged article has become widespread. Commercial and practical success has been found when the foamed plastics, such as polyurethane, wholly surrounds a packaged article, and various techniques have been used to position and form the foamed plastics within the carton. However, many of these methods have been found to be inadequate both in cost and time.

Early foam packaging developments suspended the article to be protected within a container in spaced relation to the walls. A foamable plastic was then introduced into the spaces between the container walls and object. The foamable plastic expanded, taking up the spaces between the container walls and articles. A variation of this method included the use of plastic bags, filled with foamable plastic which were then placed within the shipping container. The foamable plastic expanded within the bags and the expanding bags encompassed the object. The plastic bags formed a separation line which permitted removing the encapsulated object with ease.

These systems of packaging proved disadvantageous since the article to be encased had to be suspended within the container prior to encapsulation. To overcome the hinderance of suspending an article before encapsulation, a method, known as carton molding, was developed which formed the molded foamable plastic in the carton or container before the article was placed therein. U.S. Pat. No. 4,390,337 to Gately discloses the current, conventional process of producing synthetic foamed material into predetermined shapes at preselected locations inside a container or carton.

In the current and conventional method, a male mold is provided with an image conforming to the size and shape or sizes and shapes of the desired articles to be placed therein. A horizontal flap area consisting of two horizontal channels is incorporated into the mold to allow the formation of foam panels on two of the carton flaps to form a protective top covering once the carton is closed. A plastic sheet is placed over the mold to provide a surface on which the packaged object will rest once the foam is formed. A vacuum internal to the mold is applied to assist the placement of the plastic sheet and to secure the sheet to the mold. An open-ended carton is then placed over the mold with two of the lower end flaps in a horizontal position. The plastic sheet is folded back over the horizontal flaps to close the ends of the channels; the horizontal flaps are clamped securely to the mold; foam precursors are dispensed within the carton, and the top of the carton is closed and secured. When the precursors have foamed, the clamps are released and the finished box ejected from the mold.

This current and conventional process has achieved significant commercial usage and is decidedly advantageous over previously available methods. However, this process does have several disadvantages, foremost of which is the necessity of manually placing the plastic sheet in areas of the mold that are difficult to reach and then folding the plastic back over the horizontal flaps. Since the horizontal mold also requires a large amount of floor space, mounting such a mold on automated molding equipment is difficult. These disadvantages make full automation impractical. Further disadvantages of this horizontal molding include the requirement of a complex mold with restrictive channeling techniques designed to force the foam into the horizontal flap areas of the mold, the lack of control over foam densities in the flap areas and the impracticability of using poly tube materials.

The present invention overcomes these disadvantages and provides an even more advantageous process and apparatus which use a fully vertical mold where all carton flaps can be placed in a vertical position. The plastic sheet does not have to be doubled-up over the vertical flaps, and the lack of a horizontal channel also permits ease in the placing and tucking of a plastic sheet or a poly tube material over the mold by either manual or mechanized techniques. The fully vertical mold provides for gravity flow of foam into the flap areas of the mold with a better control of foam densities in flap areas. In addition, the overall mold is simpler and requires smaller mold construction techniques and less floor space making mounting on automated molding equipment practical with a better control of foam densities in flap areas. These advantages of the present invention lend this process to a greater degree of automation.

With the foregoing in mind, it is an object of the present invention to provide an efficient foam molding process and apparatus for the molding of foam inside a carton for the cushioning of an article to be placed therein which overcome the disadvantages of the currently used process.

A more specific object of the present invention is to provide a method of and an apparatus for foam carton molding using a fully vertical mold which provide full automation when placing the plastic sheet routinely over the mold and which simplifies the channeling requirements of the mold design.

SUMMARY OF THE INVENTION

In accordance with the present invention, there are provided a method of and an apparatus for foam molding packaging using a fully vertical mold having open-topped, closed bottomed channeled vertical mold cavities on the sides of the mold. The mold is covered with a plastic sheet and an open-ended carton having upper and lower flaps in a vertical position is placed over the mold. The channeled vertical mold cavities have the adjacent lower flaps disposed in juxtaposed relation thereto. These flaps are secured and then foam plastic precursors are dispensed into the carton onto the mold and into the vertical flap areas. The upper flaps are closed to form the carton's bottom and the foam precursors permitted to foam. After the precursors have foamed and become substantially rigid, the carton is removed with the plastic sheet firmly adhered to the foam.

In accordance with one embodiment of the invention, a frame of brushes assists the placement of the plastic sheet over the mold. The frame moves downward along the mold, with the brushes forcing the plastic sheet against all mold areas. A vacuum drawn on the mold surfaces from inside the mold conforms and holds the plastic sheet to the mold surface once the frame of brushes is retracted.

Further, in accordance with the present invention, the plastic sheet may be intermittently fed and cut to a predetermined length with a hot wire.

BRIEF DSCRIPTION OF THE DRAWINGS

The above description, as well as further objects, features and advantages of the present invention, will be more fully understood by reference to the following detailed description of a presently preferred, but nonetheless illustrative, method of and apparatus for foam molding packaging using a vertical mold, where:

FIG. 3 shows a reduced perspective view of the apparatus shown in FIGS. 1 and 2 showing the mold covered with a plastic sheet, the frame of brushes assisting the placement of the plastic sheet, and the vacuum source;

FIG. 4 is a view similar to FIG. 3 illustrating the placement of an open-ended shipping carton over the plastic sheet covered mold;

FIG. 5 is a view similar to FIGS. 3 and 4 illustrating the injection of foam precursors into the carton and onto the mold;

FIG. 6 is a view similar to FIGS. 3-5 illustrating the closure of the upper flaps of the cartin after the foam precursors have been injected into the carton;

FIG. 7 is an enlarged sectional view taken substantially along line 7—7 in FIG. 6; and FIG. 8 is an exploded perspective view illustrating the completed foam molded carton with an article to be packaged.

DETAILED DESCRIPTION OF THE PREFERRED EMBODIMENTS

Figure 1:
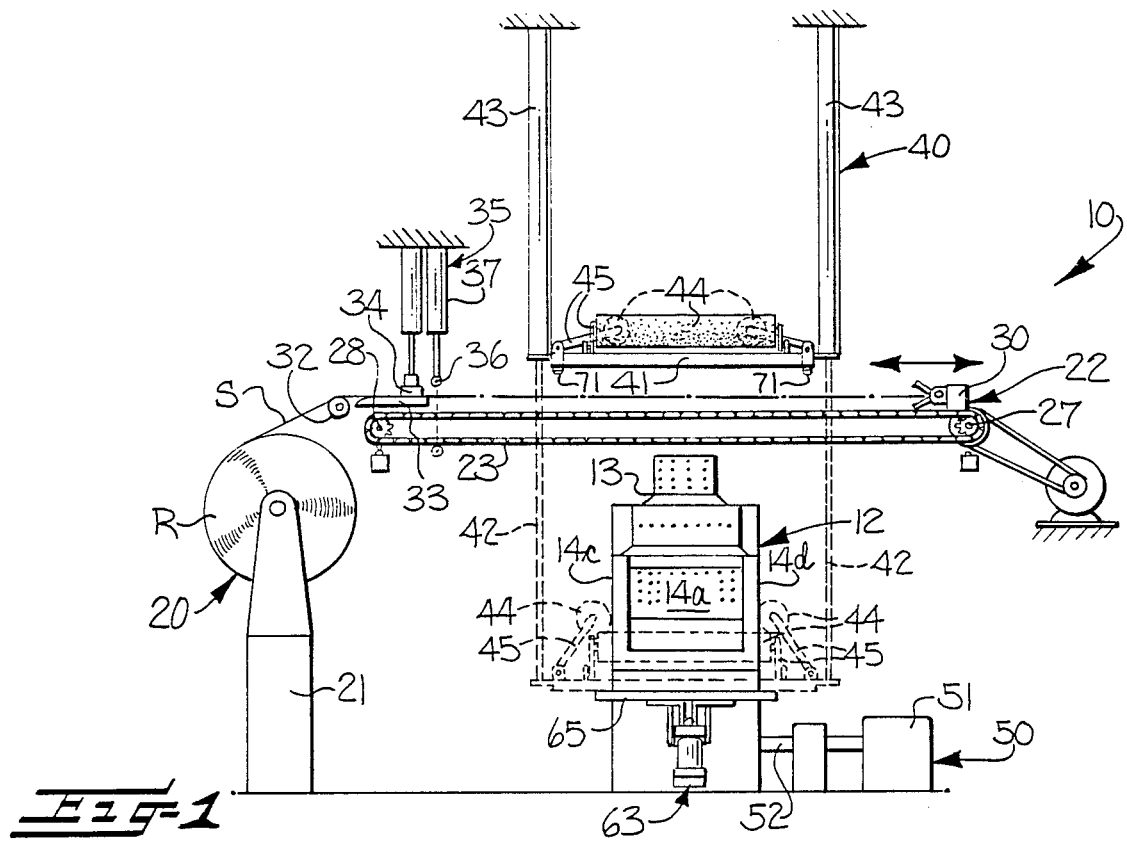
FIG. 1 is a side elevational view of the apparatus of the present invention.
Figure 2:
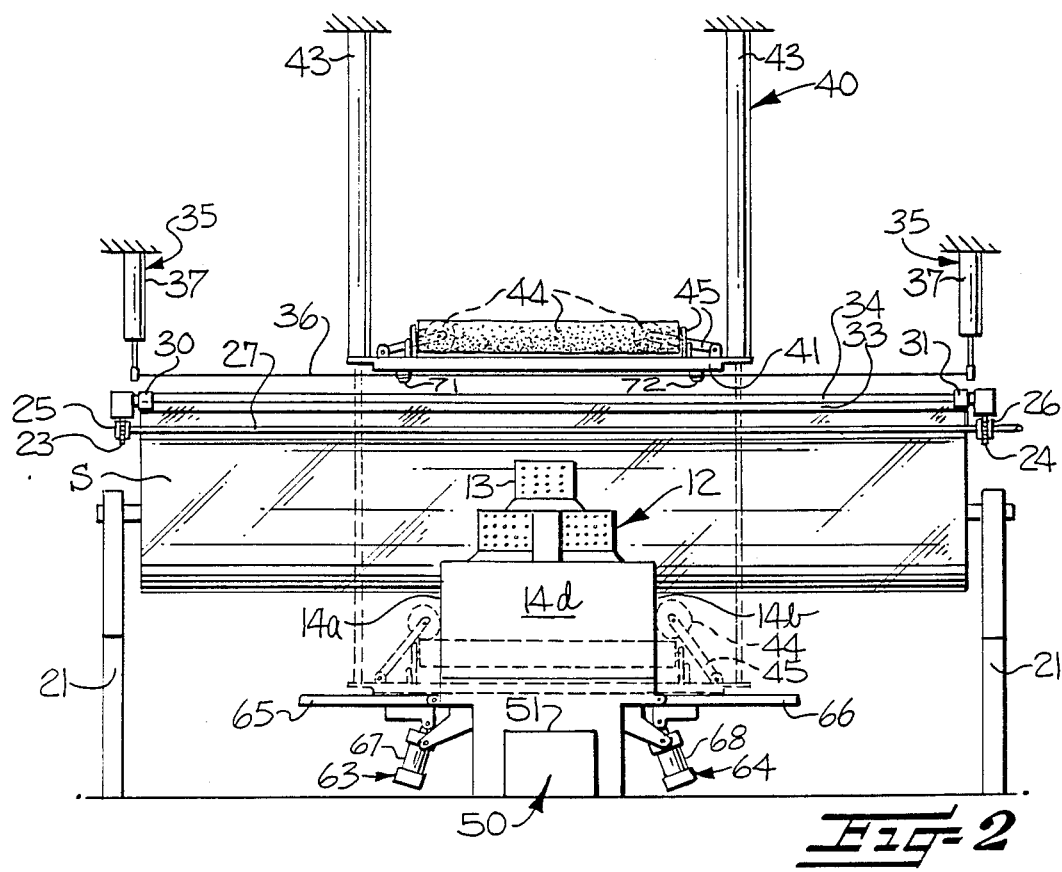
FIG. 2 is a front elevational view of the left end of the apparatus show in FIG. 1.

Referring now to the drawings, there is shown in FIG. 1 an apparatus for foam molding packaging in a carton designated generally at 10. This apparatus 10 includes a mold 12 having on the upper portion thereof a male mold image 13 corresponding to the shape and size of the article to be packaged. Mold 12 further includes on the lower portion thereof four vertical side walls 14a, 14b, 14c and 14d, respectively, which are of substantially the same external dimensions as the internal dimensions of the shipping carton to be received thereover. Opposing side walls 14a and 14b have flap mold areas or recesses, which define vertical mold cavities 15 and 16 thereon, respectively, (FIG. 4) for molding foam panels onto two of the lower carton flaps (FIGS. 7 and 8). The vertical mold cavities 15, 16 comprise open-topped, closed-bottomed channels of a suitable size and shape to form foam panels on the carton flaps which together will close the top of the cavity in the foam cushioning formed by male mold image 13 when the carton flaps are closed. The vertical mold cavities are open in the horizontal direction and also open in the vertical direction so as to communicate with the upper surface of the mold.

Means are provided for positioning a sheet S of plastic film in conforming relation to the mold 12, and which may also hold the plastic sheet S in position during the molding of the foam. The plastic sheet positioning means includes means 20 for covering the mold 12 with the plastic sheet S which comprises a stand 21 supporting a roll R of the plastic sheeting. Means 20 also includes means 22 for withdrawing a predetermined length of the plastic sheeting from the roll R and for feeding this predetermined length into a position overlying the mold 12. Feeding means 22 comprises a pair of reversible, endless chain conveyors 23, 24 mounted on respective pairs of sprockets 25, 26 mounted on opposite ends of drive shafts 27, 28, respectively. The chain conveyors 23, 24 are disposed above and on opposite sides of the mold 12 and carry gripper means 30, 31 thereon. Gripper means 30, 31 grasp the leading end of the plastic sheeting when the gripper means 30, 31 have been moved by the chain coneyors 23, 24 to the extreme left as seen in FIG. 1. Upon movement of the gripper means 30, 31 by the chain conveyors 23, 24 to the right as seen in FIG. 1, the gripper means 30, 31 pull the plastic sheeting therewith over a guide roll 32 and a guide plate 33. One of the drive shafts 27, 28 is driven in a manner not shown to cause the chain conveyors 23, 24 to move the gripper means and suitable limit switches (also not shown) are provided at the ends of the path of travel of the gripper means to control the travel of the gripper means 30, 31. The limit switch at the left hand end of the path of travel of the gripper means 30, 31 (FIG. 1) reverses the direction of the chain conveyors 23, 24 and actuates the gripper means 30, 31 to grasp the leading end of the plastic sheeting. The limit switch at the right hand end of the path of travel of the gripper means 30, 31 stops the conveyors 23, 24, actuates a clamping means 34 which clamps the plastic sheeting against the guide plate 33, and actuates a cut-off means 35 comprising a hot wire 36 carried by the pistons of pneumatic or hydraulic cylinders 37 for vertical movement through the plane of the plastic sheeting to sever the predetermined length of plastic sheeting from the roll R. Finally, the gripper means 30, 31 are actuated after the cut-off means 35 to release the plastic sheet S and permit the same to fall loosely over the mold 12. The left hand limit switch releases the clamping means 34 when it actuates the gripper means 30, 31 and reverses the chain conveyors 23, 24.

Alternatively, instead of drawing a predetermined length of plastic sheeting into a position over the mold 12, a predetermined length of poly tube material may be drawn over the mold 12 and placed into a vertical position overlying the mold 12. The upper end of the tube is sealed and the lower open end of the tube is positioned over the mold 12. The poly tube material is then drawn into a covering and conforming relation to the mold 12. Any mechanical or vacuum means associated with the positioning and placement of a plastic sheet into covering and conforming relation to the mold 12 may also be readily adapted to the use of poly tube materials.

The means for positioning the plastic sheet S over the mold 12 further comprises means 40 for forcing the plastic sheet firmly against the surface of the mold 12 to cause the plastic sheet S to conform generally to the shape and contours of the mold image. Means 40 includes a vertically movable, rectangular frame 41, the inside dimensions of which are slightly larger than the outside dimensions of the mold 12. Frame 41 is mounted on the lower ends of piston rods 42 of pneumatic or hydraulic cylinders 43 for vertical movement betwen an upper, retracted position above the mold 12 to a lower position below the flap mold areas 15 and 16. Four brushes 44 are pivotally mounted on the frame 41 by pivoting arms 45 which are spring biased inwardly and downwardly. The frame 41 is moved downwardly relative to the mold 12, with the spring biased arms 45 forcing the brushes 44 into contact with the mold 12, which pulls and brushes the plastic sheet S downwardly and inwardly into generally conforming relation to the surface of the mold 12.

The means for covering the mold 12 with a plastic sheet S also includes means 50 communicating with the surface of the mold 12 through the interior of the mold 12 for drawing a vacuum on the surface of the mold to draw the plastic sheet S into closely conforming relation to the surface of the mold images on the mold 12. Vacuum means 50 includes a vacuum pump 51 which communicates by pipes 52, 53 and 54 with three chambers 55, 56 and 57 within the mold 12. In turn, the chambers 55, 56 and 57 communicate with the outer surface of the mold images by means of appertures 60, 61 and 62, respectively. The vacuum may be drawn on all of the surfaces of the mold 12 simultaneously or by suitable valving in a staged manner commencing with the upper chamber 55 and ending with the lower chamber 57.

With the plastic sheet S thusly in covering and conforming relation to the mold 12, a shipping carton C may now be placed in position for the molding of foam cushioning therein. The carton C is open-ended and is placed over the mold 12 with the lower flaps thereof disposed vertically and in juxtaposed relation to the vertical sides 14a, 14b, 14c and 14d of the mold 12. Two of these lower flaps are positioned against the opposing sides 14a and 14b having the flap mold cavities 15 and 16 therein.

Clamping means 63, 64 are provided for clamping these carton flaps against the sides 14a and 14b of the mold 12 and comprise clamping members 65, 66 pivotally mounted on the lower portion of mold 12 and pneumatic or hydraulic actuating means 67, 68 for moving the clamping members 65, 66 between clamped and unclamped positions.

With the carton C in proper, clamped position, plastic foam precursors are dispensed by precursor dispensing means 70 into the carton C and onto the plastic sheet covered mold 12 through the open upper flaps. These flaps are then closed and sealed (FIG. 6) before foaming of the precursors is completed. Once the foaming of the precursors is completed, the clamping means 63, 64 are released and the finshed carton is removed from the mold 12.

The molding operation, in accordance with the present invention, is commenced by the operator closing a start switch (not shown) to cause the conveyors 23, 24 to move the gripper means 30, 31 to the left as seen in FIG. 1. When the gripper means 30, 31 reach the left-hand end of their path of travel, the limit switch at that end is activated to reverse the conveyors 23, 24, close the gripper means 30, 31 to grasp the leading end of the plastic sheeting, and release the clamping means 34.

The plastic sheet S is withdrawn from the roll R over the guide roll 32 and guide plate 33 as the gripper means 30, 31 travel from the left to the right as seen in FIG. 1. When the gripper means 30, 31 reach the right-hand limit of their path of travel, the limit switch at that right-hand end stops the conveyors 23, 24, activates the clamping means 34 which clamps the plastic sheeting against the guide plate 33, and activates the cut-off means 35. The hot wire 36 is moved downwardly by the pistons of the pneumatic or hydraulic cylinders 37 to sever the plastic sheeting from the roll R. Simultaneously, the right-hand limit switch causes the gripper means 30, 31 to release the plastic sheet S which is permitted to fall loosely over the mold 12. To assure that the plastic sheet S falls properly over the mold 12, air from nozzles 71, 72 attached to the movable frame 41 may be directed downward onto the sheet S to assist in the placement of the sheet over the mold 12.

After the plastic sheet S has covered the mold 12, the frame 41 is caused to travel downward by actuation of the cylinders 43 and the pivoting arms 45 force the brushes 44 inwardly and downwardly into contact with the plastic sheet and the mold 12. Referring to FIG. 3, as the frame travels downwardly across the mold 12 and side walls 14a, 14b, 14c, and 14d, the brushes 44 exert pressure on the mold 12 which forces the plastic sheet S against the surface of the mold 12 and into general conformance therewith.

After the frame 41 has traveled downward across the mold 12 to a position below the flap mold areas 15 and 16, a vacuum is applied to the surface of the mold 12 from the vacuum pump 51. In order to assure a more uniform placement of the plastic sheet S over the mold 12 when the vacuum is applied, a staged vacuum is preferably used. With the internal mold vacuum applied and the plastic sheet S conforming to the mold surface and secured firmly, the frame 41 is retracted upwardly to the initial starting point by reversal of the cylinders 43.

An open-ended shipping carton C is then placed over the mold 12. Two of the lower flaps of the carton are positioned against the opposing sides 14a and 14b and the clamping members 65 and 66 are moved to the clamped position by the actuating means 67, 68 thereby clamping the lower flaps of carton C against the side walls 14a, 14b and in proper position relative to the flap mold cavities 15 and 16.

An operator may then manually dispense foam precursors into the carton C and onto the mold 12 by the dispensing means 70. The amount of foam precursors injected into the carton C may be calculated beforehand and the dispensing means 70 preset. Alternatively, an automatic dispensing system may be used.

Because of the vertical orientation of the flap mold cavities 15, 16, the foam precursors may readily flow into these areas by gravity while the closed bottoms thereof limit the downward flow to the areas of the carton flaps onto which the foam panels are to be formed. This greatly facilitates the molding of the foam panels on the carton flaps.

The upper flaps of the open carton C are closed and secured tightly by glue or tape to form the bottom of the carton C before the foaming of the precursors is completed. Once the foaming of the precursors is completed, the clamping means 63 and 64 are released, and the finished carton is removed. Because the plastic sheet S is between all of the surfaces faces of the mold 12 and the foam cushioning the plastic sheet forms a release line and the carton C may be removed easily from the mold 12. In addition, the plastic sheet S is firmly adhered to the foam cushioning and forms a separation between the article A to be packaged and the foam cushioning (FIG. 8).

Although the invention herein has been described with reference to a particular embodiment, it is to be understood that numerous modifications may be made in the illustrative embodiment and other arrangements may be devised without departing from the spirit and scope of the present invention as defined by the appended claims.

That which I claim is:

1. A method of molding foam in a carton comprising
   (a) providing a mold having an upper surface and four vertical side walls, with at least two opposite side walls each having a recess defining a vertically extending mold cavity which is open in the horizontal direction and also open in the vertical direction so as to communicate with said upper surface of the mold;
   (b) covering the mold with a plastic sheet;
   (c) placing an open-ended carton having upper and lower flaps over the mold while positioning said lower flaps in a vertrcal position and with at least two of said lower flaps being in juxtaposed relation to respective ones of said mold cavities;
   (d) securing said at least two lower flaps to the mold in juxtaposed relation to said mold cavities;
   (e) dispensing foam plastic precursors into said carton and onto the mold, a portion of said precursors entering said mold cavities through the open tops thereof;
   (f) closing said carton's upper flaps to form the bottom on said carton prior to completion of the foaming of the precursors therewithin; and
   (g) permitting the precurors to foam and become substantially set within said carton and around said mold to form foam cushioning within said carton and on at least two of said lower flaps thereof with a-cavity of a shape and size adapted to conformingly receive an article to be packaged therein.

2. A method according to claim 1 wherein said step of covering the mold with a plastic sheet includes feeding a predetermined length of plastic sheeting from a roll into a position overlying the mold.

3. A method according to claim 2 including severing the predetermined length of plastic sheeting and permitting the plastic sheet to fall loosely over the mold.

4. A method according to claim 1 wherein said step of covering the mold with a plastic sheet includes forcing said plastic sheet firmly against said mold to cause the plastic sheet to conform generally to the contours of the mold.

5. A method according to claim 4 including drawing a vacuum on the mold surfaces to conform and hold the plastic sheet to the mold.

6. A method according to claim 5, wherein the plastic sheet is forced against the mold by brushing the plastic sheet thereagainst with brushes carried by a frame encompassing the outer perimeter of the mold prior to the drawing of a vacuum on the mold surfaces.

7. A method according to claim 1, wherein the step of covering the mold with a plastic sheet includes
   (a) feeding a predetermined length of plastic sheeting from a roll into a position overlying the mold, severing the length of plastic sheeting to remove the same from the roll and permitting the plastic sheet to fall loosely over the mold, and
   (b) forcing the plastic sheet firmly against the mold to cause the plastic sheet to conform generally to the surface of said mold.

8. A method according to claim 7, wherein the plastic sheet is forced against the mold by brushing the plastic sheet thereagainst with brushes carried by a frame encompassing the outer perimeter of the mold and thereafter drawing a vacuum on the mold surfaces from the interior of the mold to conform and hold the plastic sheet on the mold.

9. A method of molding foam in a carton comprising the steps of
   (a) providing a mold having four vertical side walls, with at least two opposite side walls each having a recess defining a vertically extending mold cavity which is open in the horizontal direction and also open in the vertical direction,
   (b) feeding a predetermined length of plastic sheet into a position overlying the mold;
   (c) severing the plastic sheet and permitting the plastic sheet to fall loosely over the mold;
   (d) brushing the plastic sheet firmly against the mold with brushes carried by a frame encompassing the outer perimeter of the mold by moving the frame and brushes downwardly from an upper, retracted position to a lower position below the vertical mold cavities of the mold;
   (e) drawing a vacuum on the mold surfaces from the interior of the mold to conform and hold the plastic sheet to the mold;
   (f) retracting the frame and brushes to the upper position above the mold;
   (g) placing an open-ended carton with upper and lower flaps over the mold with the lower flaps in a vertical position and with at least two of said lower flaps being in juxtaposed relation to respective ones of said mold cavities
   (h) securing said at least two lower flaps to the mold in juxtaposed relation to said mold cavities;
   (i) dispensing foam plastic precursors into the carton and onto the mold while permitting such precurosrs to flow by gravity into the vertical mold cavities through the open tops thereof;
   (j) closing the carton's upper flaps to form the bottom on the carton prior to completion of the foaming of the precursors therewithin;
   (k) permitting the precursors to foam and become substantially set within the carton and around the mold to form foam cushioning in the carton and on at least two of said lower flaps thereof with a cavity for conforming receipt of an article to be packaged; and
   (l) removing the carton from the mold.

10. Apparatus for molding foam cushioning in a carton comprising
    (a) mold means for receiving and positioning a carton in which the foam is to be molded and including a male mold image on the upper portion thereof substantially corresponding to the shape and size of the article to be packaged and defining therearound a space adapted to receive foam during molding thereof, said mold means having an upper surface and sides on the lower portion thereof for receiving and positioning the carton flaps vertically and with at least one of said vertical sides having a recess defining a vertically extending mold cavity which is open in the horizontal direction and also open in the vertical direction so as to communicate with said upper surface of said mold and for molding a foam panel onto one of the carton flaps to cover and protect the packaged articles when the carton is closed,
    (b) vacuum means for holding a sheet of plastic film in conforming and covering relation to said mold means during the molding of the foam, (c) means for clampingly securing one of the carton flaps in juxtaposed position with respect to said one vertical side of said mold means during molding of the foam, and (d) means for dispensing foam platic precursors into the carton and onto said mold means to form the molded foam cushioning in the carton and on at least one of the flaps thereof.

11. An apparatus as claimed in claim 10, wherein said vacuum means includes means communicating with the surface of said mold means through the interior of said mold means for drawing a vacuum on the surface of said mold means and on the plastic sheet to draw the plastic sheet into conforming covering relation to the surface of the mold means and to hold the plastic sheet in that position.

12. An apparatus as claimed in claim 11, further comprising means for positioning a plastic sheet over the surface of said mold means including a vertically movable frame encompassing the outer perimeter of the mold and a plurality of brushes carried by said frame and movable therewith to engage and force the plastic sheet against the mold as said frame and brushes move vertically relative to said mold means.

13. An apparatus as claimed in claim 10, wherein said means for clampingly securing one of the carton flaps includes a clamp pivotally mounted on the side of the mold means beneath said mold cavity.

14. An apparatus as claimed in claim 10, wherein said mold means has four vertical sides in a substantially rectilinear arrangement with two of the opposing vertical sides having said mold cavities thereon.

15. An apparatus as claimed in claim 14, wherein said means for clampingly securing the carton flaps comprises a clamp pivotally mounted on each of the opposing vertical sides of said mold means having said mold cavities therein, and actuating means for moving each of said clamps between clamped and unclamped positions.

16. An apparatus according to claim 10, including means for feeding a predetermined length of plastic sheet from a roll into a position overlying the mold and means for severing the length of plastic sheeting to remove the same from the roll to permit the plastic sheet to fall loosely over the mold.

17. An apparatus for molding foam cushioning in a carton comprising (a) mold means for receiving and positioning a carton having a four lower flaps and in which the foam is to be molded and including a male mold image on the upper portion thereof substantially corresponding to the shape and size of the articles to be packaged and defining therearound a space adapted to receive foam during molding thereof, said mold means having an upper surface and four vertical sides in a substantially rectilinear arrangement on the lower portion thereof for receiving and positioning the four lower carton flaps vertically and including flap mold areas on two opposing vertical sides for molding foam panels onto the carton flaps to cover and protect the packaged articles when the carton is closed, each of said flap mold areas comprising a recess defining a vertically extending mold cavity which is open in the horizontal direction and also open in the vertical direction so as to communicate with said upper surface of said mold, and with each mold cavity being closed at the bottom to confine the foam to the desired areas of the carton flaps, (b) means for positioning a sheet of plastic film in conforming and covering relation to said mold means and comprising a frame encompassing the outer perimeter of said mold means and being vertically movable along said mold means, and a plurality of brushes carried by said frame and engageable with said mold means to force the plastic sheet against said mold means upon vertical movement thereof, (c) means communicating with the surface of said mold means though the interior of said mold means for drawing a vacuum on the surface of said mold means and on the plastic sheet to draw the plastic sheet into conforming covering relation to the surface said mold means and to hold the plastic sheet in that position, (d) a plurality of clamps pivotally mounted on the two opposing vertical sides of said mold means beneath said mold cavities for clampingly securing the carton flaps in position with respect to said vertical sides of said mold means during molding of the foam, and (e) means for dispensing foam plastic precursors into the carton in the space around said male mold image and into said mold cavities of said mold means to form the molded foam cushioning in the carton and on the flaps thereof.

* * * * *